Nov. 5, 1957      L. D. CLEVELAND      2,812,511
AUTOMATICALLY ACTUATED SIGNAL ASSEMBLY FOR POWER UNITS
Filed Oct. 5, 1956      3 Sheets-Sheet 1
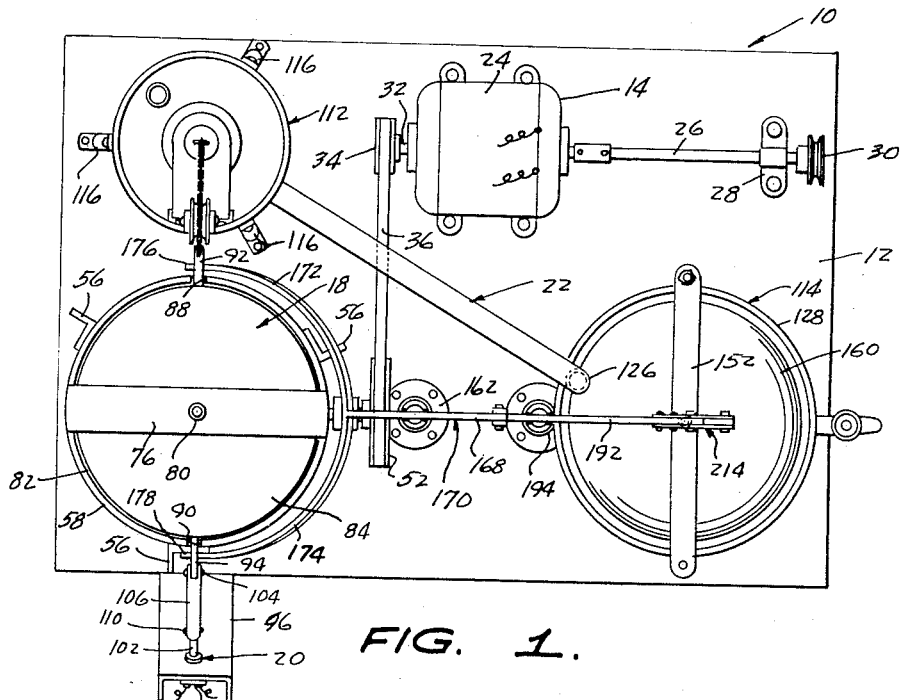
FIG. 1.
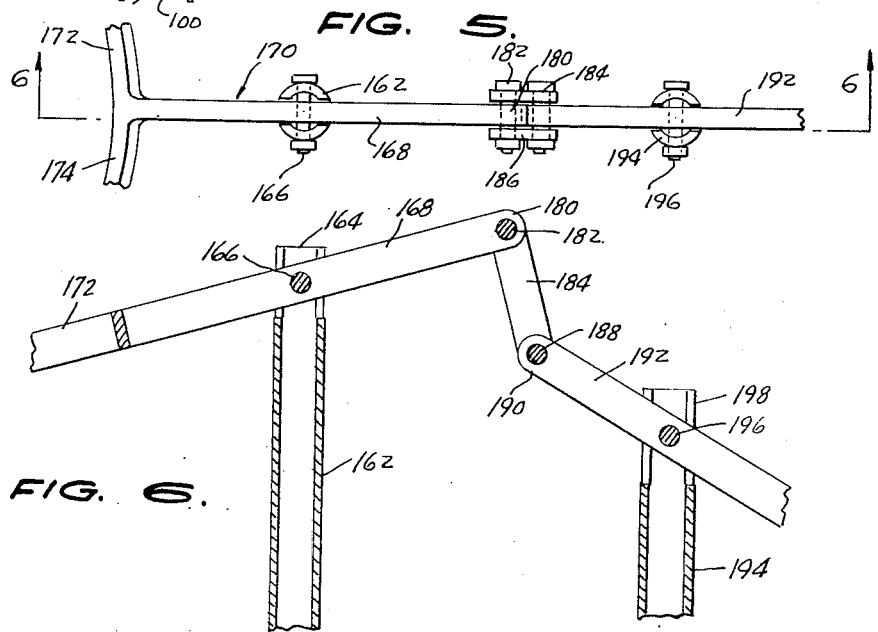
FIG. 5.
FIG. 6.
INVENTOR.
LESTER D. CLEVELAND,
BY
McMorrow, Berman + Davidson
ATTORNEYS.

INVENTOR.
LESTER D. CLEVELAND,
BY
McMorrow, Berman + Davidson
ATTORNEYS.

Nov. 5, 1957 L. D. CLEVELAND 2,812,511
AUTOMATICALLY ACTUATED SIGNAL ASSEMBLY FOR POWER UNITS
Filed Oct. 5, 1956 3 Sheets-Sheet 3

INVENTOR.
LESTER D. CLEVELAND,
BY
McMorrow, Berman + Davidson
ATTORNEYS.

United States Patent Office 2,812,511
Patented Nov. 5, 1957

2,812,511

AUTOMATICALLY ACTUATED SIGNAL ASSEMBLY FOR POWER UNITS

Lester D. Cleveland, Whiteflat, Tex.

Application October 5, 1956, Serial No. 614,279

1 Claim. (Cl. 340—239)

This invention relates generally to signal systems and is more particularly concerned with an automatically actuated signal assembly for power units which may be located in a relatively remote location, for example, in the case of irrigation systems.

In regions where irrigation systems are prevalent, and in other related installations, it is highly desirable to be immediately apprised of a failure of operation of a power unit utilized for driving an irrigation pump or the like. In irrigation systems, for example, the power unit mentioned may be located in a relatively remote region, perhaps miles from a person's house. Accordingly, it is highly desirable that a person operating the irrigation system be immediately apprised of the failure of operation of the power unit of any one of a number of pumps utilized in the irrigation system.

A primary object of invention in conformance with that set forth is to provide an automatically actuated signal system for power units including means automatically operated by activation and deactivation of the power unit for controlling a signal system and apprising a person remotely disposed from the power unit of the condition of operation of said power unit for a predetermined increment of time.

A further object of invention in conformance with that set forth is to provide a novel automatically actuated signal assembly of the character involved which incorporates a power unit for driving an irrigation pump or the like, said power unit being operatively connected to a fan assembly for creating an upwardly directed draft, a draft-responsive member overlying the fan assembly and supported for vertical reciprocable movement thereover in response to activation and deactivation of the fan assembly, means extending from the draft-responsive member for actuating a two-position switch which will be incorporated in the signal system for apprising a remotely disposed person of the condition of operation of the power unit, said draft-responsive member being operatively connected to a timing assembly incorporating means permitting a switch assembly to be activated for a predetermined increment of time.

And yet a further object of invention in conformance with that set forth is to provide an automatically actuated signal assembly of the character involved which is readily and economically manufactured, easily installed and maintained, and highly satisfactory, practical and acceptable for the purpose intended.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

Figure 1 is a top plan view of the novel automatically actuated signal assembly;

Figure 5 is an enlarged fragmentary plan view looking substantially from line 5—5 of Figure 2; and Figure 6 is a fragmentary vertical section view taken substantially on line 6—6 of Figure 5.

Figure 3:
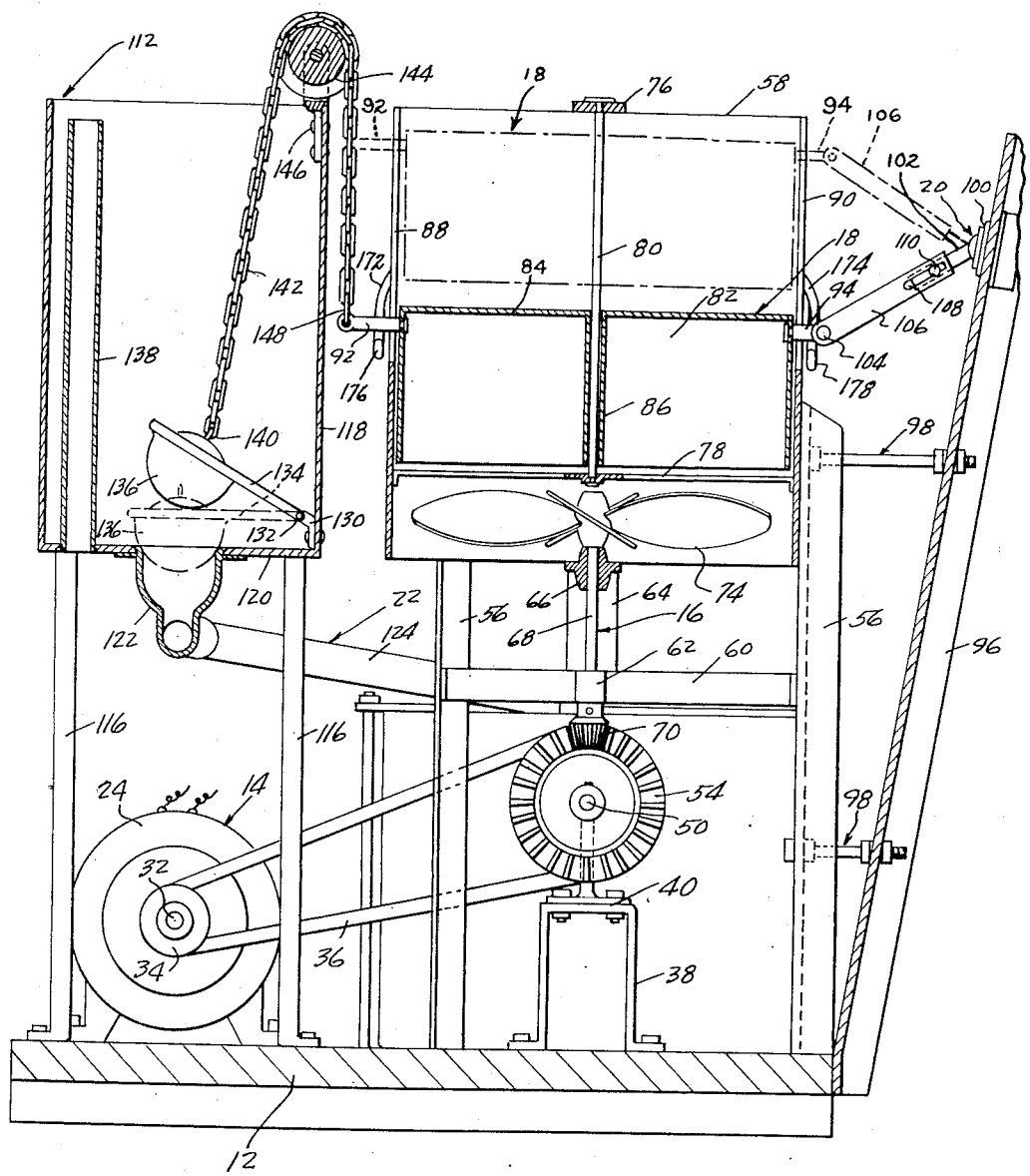
Figure 3 is an enlarged vertical section view taken substantially on line 3—3 of Figure 2, portions being broken away, and showing by means of dotted lines an alternate position of valve means utilized in a metering tank of the assembly.

Referring to the drawings in detail, the automatically actuated signal assembly is indicated generally at 10 comprising a suitable support member 12 of any suitable material having mounted thereon a power unit 14, a fan assembly 16, see Figure 3, a draft-responsive member 18 overlying said fan assembly, a signal assembly 20, see Figure 3, and a timing assembly 22. The power unit 14 may comprise either an internal combustion engine or a suitably rated electric motor 24 as shown in the exemplary embodiment, said motor being suitably secured on the upper surface of the support member 12 and including a power output shaft 26 journaled in a suitable support bracket 28 and having secured on the terminal end thereof a drive pulley 30, for example, over which a suitable drive belt may be entrained to be operatively connected to an irrigation pump, for example. Extending from the electric motor 24 opposite the power-output shaft 26 is a drive shaft 32 having suitably secured on the terminal end thereof a drive pulley 34 over which a suitable drive belt 36 is entrained. A suitable support member 38 is secured in spaced relationship from the power unit 14 on the upper surface of the support member 12 and has suitably mounted on the upper surface 40 thereof a pair of aligned journal brackets 42 and 44 incorporating upper aligned tubular journal sleeves 46 and 48, respectively, rotatively supporting therethrough an intermediate drive shaft 50. Suitably secured on one end of the shaft 50 in planar alignment with the drive pulley 34 is a driven pulley 52 over which the drive belt 36 is entrained. Accordingly, operation of the electric motor 24 results in rotation of the drive shaft 50. Suitably secured on the opposite end of the drive shaft 50 is a bevel drive gear 54.

Extending vertically in suitably secured spaced relationship from the upper surface of the support member 12 and surrounding the bevel drive gear 54 are a plurality of suitable support legs 56, three for example, which have suitably secured at their upper ends a cylindrical sleeve or tunnel member 58 comprising a cooperating portion of a fan assembly 16 and draft-responsive member 18. Extending transversely of a lower intermediate portion of the legs 56 is a suitable support spider 60 incorporating a centrally located bearing portion 62 and an overlying bail portion 64 incorporating a bearing portion 66 in axial alignment with the bearing 62. Journaled in the bearings 62 and 66 is a driven shaft 68, the lower end of which having suitably secured thereon a driven bevelled pinion gear 70 drivingly engageable with the bevel drive gear 54. The upper end of the shaft 68 has suitably secured thereon a suitable propeller 74 incorporating four blades if desired. The propeller 74 is disposed in the lower portion of the sleeve 58 as clearly seen in Figure 3. Rotation of the propeller 74 causes an upward draft through the sleeve or air tunnel 58. Accordingly, when the power unit 14 is operating the propeller 74 will be rotated to cause an upwardly directed draft through said sleeve 58.

The sleeve 58 has extending diametrically in suitably secured relationship a support plate 76 and extending diametrically in underlying relationship from the support plate 76 is a suitably secured transversely disposed support spider member 78, and extending vertically therebetween in circumposed relationship relative to the tubular sleeve 58 is a support shaft 80.

The draft-responsive member 18 comprises a downwardly opening cylindrical shell member 82 incorporating a transverse closed top end 84 which has depending therefrom a suitably secured tubular sleeve 86 circumposed on the shaft 80. The draft-responsive member 18 is free to move between the limits of the support plate 76 and the spider member 78, and when an upwardly directed draft is caused by rotation of the propeller 74 the draft-responsive member 18 will be retained in a vertically disposed position within the tubular sleeve or air tunnel 58.

Extending vertically from an intermediate portion of the tubular sleeve or wind tunnel 58 in diametrically opposed relationship are upwardly opening slots 88 and 90, see Figure 3, which reciprocably receive therethrough oppositely disposed and suitably secured trunnion elements 92 and 94, respectively.

A suitably secured elongated support member 96 is supported in angularly extending relationship from one side edge of the support member 12, see Figure 3, being fixedly retained to an adjacent vertically extending support member 56 by means of suitable bolt assemblies 98. The support member 96 has fixedly secured thereon a signal assembly 20 which incorporates, for example, a suitable two-position toggle switch 100 incorporating an actuating lever 102 which will be vertically pivoted due to upward and downward movement of the draft-responsive member 18. The trunnion element 94 has extending transversely therethrough a suitable pivotal support element 104 having vertically pivoted thereon a tubular sleeve 106, the opposite end of said tubular sleeve telescopically receiving the terminal end portion of the lever 102 therein. The sleeve 106 incorporates an elongated longitudinally extending slot 108 therethrough, and reciprocably disposed therethrough and secured in laterally extending relationship from the lever 102 is a suitable securing element 110. The elongated slot 108 accordingly provides a lost motion connection between the sleeve 106 and the lever 102 during reciprocatory movement of the draft-responsive member 18. The lever 102, see Figure 3, is shown in a position wherein the switch assembly is closing a circuit of a signal system, an audible signal device, for example (not shown), being remotely disposed from the automatically actuated signal assembly.

Figure 4:
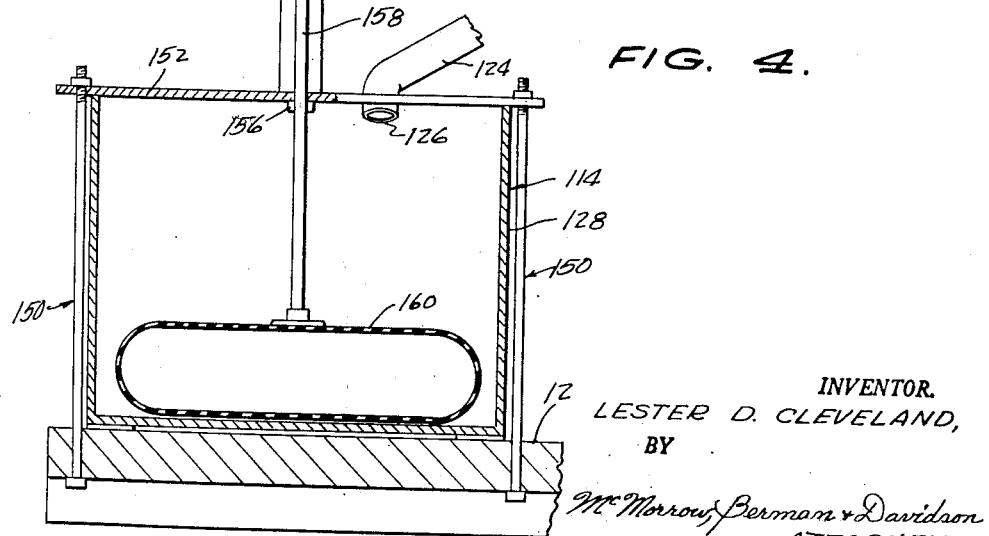
Figure 4 is an enlarged fragmentary vertical section view taken substantially on line 4—4 of Figure 2.

The timing assembly 22 comprises suitable first and second metering tanks indicated generally at 112 and 114. The tank 112 is supported in vertically extending relationship on a plurality of suitably secured support legs 116 on the upper surface of the platform or support member 12 in spaced relationship from the draft-responsive member 18. The metering tank comprises a suitable capacity open topped tank member 118 incorporating in the bottom 120 thereof in a suitable aperture portion a depending drain connection member 122 in communication with a suitable tubular conduit 124, the terminal end of which indicated at 126 overlying and communicating with a cylindrical tank member 128 constituting the metering tank 114, see Figure 4. Suitably secured on the inner periphery of member 118 adjacent the bottom wall 120 thereof is a support bracket 130 which has extending transversely therethrough a suitable support shaft 132 supporting a vertically pivotal valve member 134 which incorporates a lower semi-spherical valve portion 136 sealingly engageable in the open top of member 122 to prevent a liquid contained in the metering tank 112 from being dispensed into the tank 114. Suitably secured in vertically extending relationship and opening through the bottom wall 120 is an overflow pipe 138, the upper end of which terminating beneath the upper edge of the metering tank 112 and accordingly determining the amount of liquid, such as water from an irrigation system, for example, that is contained in the metering tank 112.

The valve 134 incorporates an integral connecting eye 140 suitably secured to flexible chain 142, an intermediate portion of said chain being entrained over a pulley element 144 and supported in vertically extending relationship by means of a suitable support bracket 146 extending above the upper edge of the metering tank, said pulley element 144 being in substantially planar alignment with the trunnion element 92. The opposite end 148 of the chain extends through a suitable apertured portion on the terminal end of the trunnion element 92. Accordingly, as the draft-responsive member 18 is lowered to the position shown in Figure 3, for example, the valve 134 is raised to the position shown in solid lines in Figure 3 wherein a liquid contained in the metering tank 112 is permitted to descend to the metering tank 114. Obviously, upward movement of the draft-responsive member results in the closing of the valve 134 into its seated position shown by means of dotted lines in Figure 3.

The metering tank 114 which includes member 128 is retained on the upper surface of the support member 12 by means of a pair of suitable vertically extending bolt assemblies 150 disposed on opposite sides of the tank 128, upper ends of said bolt assemblies extending through suitable aperture portions in a support plate member 152 extending diametrically of the upper edge of the tank member 128. In communication with the interior of the tank member 128 is a suitable valve assembly 154 such as a conventional household faucet providing means for draining the metering tank 114. The plate member 152 by virtue of the bolt assemblies 150 clampingly engages and retains the tank 128 on the support member 12. The support plate 152 incorporates a centrally disposed transverse guide sleeve portion 156 which has extending therethrough for free movement therein a shaft member 158 the lower end of which being integrally secured in any suitable manner to a suitable float 160 disposed within the metering tank 114. Accordingly, as the liquid flows from the metering tank 112 to the metering tank 114, after a predetermined interval and a predetermined amount of liquid has flowed the float 160 will be vertically disposed a predetermined amount for a purpose to subsequently become apparent.

Suitably secured on the support member 12 in substantially planar alignment with the shaft 158 and the longitudinal axis of the sleeve 58 and draft-responsive member 18 is a first support member 162 incorporating at its upper end a bifurcated portion 164 having extending transversely thereacross a support shaft 166, said shaft 166 pivotally supporting a vertically pivotal elongated rod portion 168 of a lifting yoke or force transmitting lever indicated generally at 170. The yoke 170 incorporates arcuate arms 172 and 174 integral with the rod 168, terminal end portions of the arms indicated at 176 and 178, respectively, extending beneath an intermediate portion of the trunnions 92 and 94, respectively, of the draft-responsive member, see Figure 3. The lever or rod 168 has extending transversely through the terminal end 180 opposite the arms 172 and 174 a transverse suitably secured pivot element 182 which has journaled on opposite ends thereof a pair of connecting links 184 and 186, the opposite ends of said links 184 and 186 having extending transversely therethrough in aligned aperture portions a support shaft 188 pivotally mounting between said links 184 and 186 the end portion 190 of a force transmitting lever 192.

A second suitably secured vertically extending support member 194 extends from the upper surface of the support member 12 in planar alignment with the support rod 158, the support member 162 and the longitudinal axis of the draft-responsive member, said lever 192 having extending through an intermediate portion thereof a transverse support shaft 196 extending through an upper bifurcated portion 198 of the support member 194. The upper end of the shaft 158 incorporates a pair of integral longitudinally extending spaced strap elements 200 and 202 which have extending transversely through aligned aperture portions a pair of spaced support shafts 204 and 206 upon which are journaled roller elements 208 and 210 disposed between the straps 200 and 202. Freely reciprocable between the roller elements 208 and 210 is a bar or strap element 212 of a suitably constructed triangularly shaped guide member indicated generally at 214 which is integral with the opposite end 216 of the lever 192.

Figure 2:
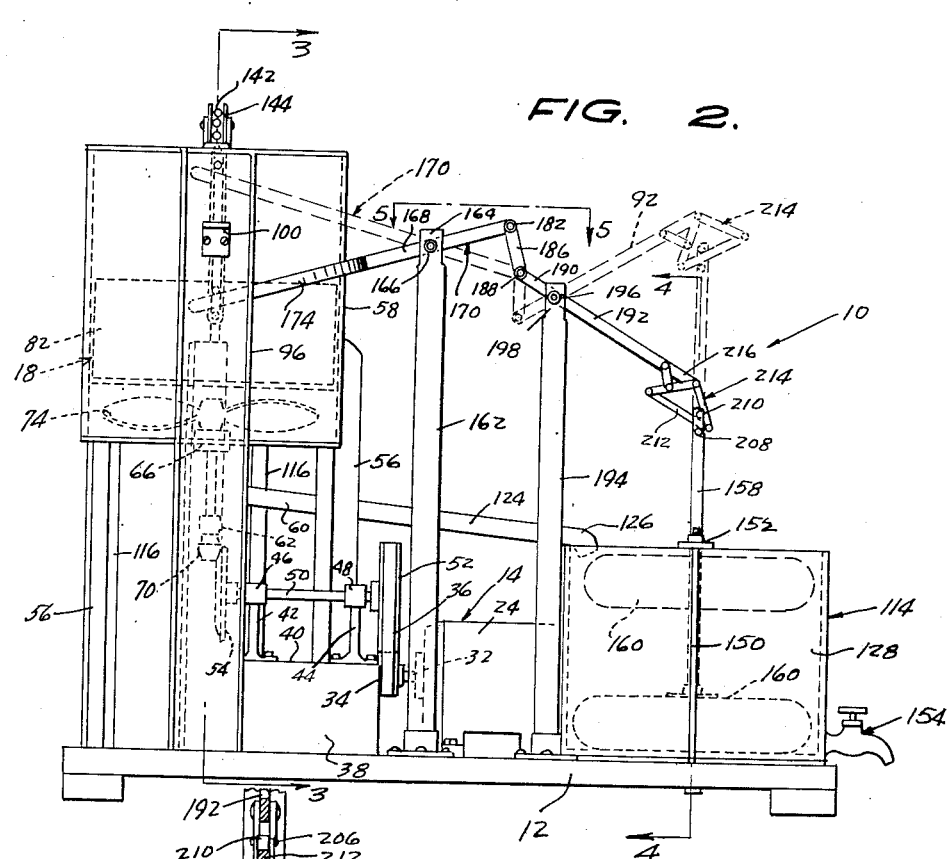
Figure 2 is a side elevational view of the novel signal assembly, showing by means of dotted lines alternate positions of the movable structure thereof operable during automatic actuation of the signal assembly.

In operation, when the motor unit 14 is operating the draft responsive member 18 is supported by the draft of air from the propeller 74 in an elevated position shown in dotted lines in Figure 3, and the valve member 134 is in the dotted line position with the valve portion 136 sealingly engaging the open top of the member 122. When the motor unit 14 ceases to operate, the propeller stops and the draft responsive member is no longer supported in the dotted line position and moves downwardly to the full line position, Figure 3, effecting the traveling movement of the chain 142 over the pulley element 144 and lifting the valve 134 from the dotted line position to the full line position as shown in Figure 3, shifting the valve portion 136 from its position closing the open top of the tank member 122 to a position, as shown in full lines, out of sealing engagement with the open top of the tank member 122. A charge of water in the tank 114 previously admitted thereto by connection to a source of supply, such as a conduit, not shown, in an irrigation system, flows through the member 122 and through the conduit 124 to the tank 114. As the level of water in the tank 114 rises, the float 160 is caused to move from the full line position, Figure 4, upwardly to the upper dotted line position in Figure 2, the upward movement of the float 160 shifting a shaft 158 upwardly and effects the pivotal movement of the lever 192 from the full line position, Figure 2, to the dotted line position and the pivotal upward movement of the yoke 170 from the full line position to the dotted line position through the connection of the adjacent end of the lever 192 to the links 184 and 186 and the connection of the links 184 and 186 to the adjacent end of the yoke 170. Upon execution of the movement upwardly of the yoke 170 the terminal portions 176 and 178 of the arms 172 and 174 engage the under sides of the trunnions 92 and 94 respectively, and raise the draft responsive member 18 to the dotted line position in Figure 3. Upon raising of the member 18, the sleeve 106 is shifted upwardly to the dotted line position, Figure 3, carrying the toggle switch lever 102 from its closed position shown in full lines to an open position, shown in dotted lines, thus opening the alarm or signal circuit. Upon draining of the tank 114 and refilling of the tank 112, the signal assembly of the present invention will be in condition for a repeat operation, in case the motor unit 14 again ceases to function.

The foregoing is considered to be illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

An automatically actuated signal assembly for irrigation systems and the like comprising a support member, a power unit on the support member including a power-output shaft for driving an irrigation pump or the like, a horizontally disposed fan assembly operatively connected to the power unit for causing an upwardly directed draft, a draft-responsive member supported in free vertically reciprocable relationship over said fan assembly to be retained in an elevated position when the fan assembly operates and to descend toward the fan assembly when the same ceases to operate, a two-position switch assembly on the support member for connection in a signal circuit for actuating a remote signal device of a signal system, force transmitting means interposed between the draft-responsive member and switch assembly for retaining the switch assembly open when the draft-responsive member is raised and closing the switch assembly when the draft-responsive member descends due to inactivity of the power unit, and a timing assembly on said support member including means operatively connected to the draft-responsive member permitting a predetermined increment of actuation of the switch assembly, said timing assembly comprising a pair of communicating metering tanks, one tank containing a metering fluid and being disposed above the other, valve means interposed between said tanks controlling communication therebetween, force transmitting means operatively connected between the draft-responsive member and valve means for opening the valve means upon a predetermined increment of descent of the draft-responsive member, a vertically reciprocable float disposed in free floating relationship in the other tank to rise as liquid is dispensed therein, and force transmitting means operatively connected between the float and the draft-responsive member for raising the draft-responsive member in response to a predetermined level of liquid in the other tank for closing the valve means and deactivating the switch assembly.

References Cited in the file of this patent

UNITED STATES PATENTS

| 2,012,088 | Rau | Aug. 20, 1935 |
| 2,696,598 | Lozowski | Dec. 7, 1954 |